(12) United States Patent  
Hasama (10) Patent No.: US 9,256,913 B2  
(45) Date of Patent: Feb. 9, 2016

(54) INFORMATION PROCESSING APPARATUS, CONTROL METHOD THEREOF, AND PROGRAM

(75) Inventor: Yuichi Hasama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 13/293,413

(22) Filed: Nov. 10, 2011

(65) Prior Publication Data

US 2012/0140268 A1 Jun. 7, 2012

(30) Foreign Application Priority Data

Dec. 7, 2010 (JP) ................................. 2010-272702

(51) Int. Cl.
| | |
|---|---|
| *G06F 3/12* | (2006.01) |
| *G06T 1/00* | (2006.01) |
| *G06F 21/10* | (2013.01) |
| *H04N 1/00* | (2006.01) |
| *G06K 15/02* | (2006.01) |

(52) U.S. Cl.
CPC ............ *G06T 1/0021* (2013.01); *G06F 3/1206* (2013.01); *G06F 3/1242* (2013.01); *G06F 3/1285* (2013.01); *G06F 3/1296* (2013.01); *G06F 21/10* (2013.01); *G06F 3/1297* (2013.01); *G06K 15/02* (2013.01); *H04N 1/00204* (2013.01)

(58) Field of Classification Search
USPC .............. 358/1.15, 1.13, 1.18, 501, 505, 530, 358/537, 540, 401, 448, 452, 453, 462, 463, 358/464, 470
See application file for complete search history.

(56) References Cited

U.S. PATENT DOCUMENTS

| | | | | |
|---|---|---|---|---|
| 7,295,677 | B2* | 11/2007 | Simpson et al. ............. | 382/100 |
| 8,023,134 | B2* | 9/2011 | Pangrazio et al. .......... | 358/1.15 |
| 8,284,421 | B2* | 10/2012 | Lee .............................. | 358/1.15 |
| 8,875,988 | B2* | 11/2014 | Nishida ........................ | 235/375 |
| 2006/0274363 | A1* | 12/2006 | Katano ........................ | 358/1.15 |
| 2008/0018921 | A1* | 1/2008 | Hori ............................. | 358/1.9 |
| 2009/0021765 | A1* | 1/2009 | Takahashi .................... | 358/1.14 |
| 2009/0262382 | A1* | 10/2009 | Nobutani .................... | 358/1.15 |

FOREIGN PATENT DOCUMENTS

| | | |
|---|---|---|
| JP | 2001-197297 A | 7/2001 |
| JP | 2003-039770 A | 2/2003 |
| JP | 2007-057735 A | 3/2007 |
| JP | 2009-172853 A | 8/2009 |

* cited by examiner

*Primary Examiner* — Vu B Hang  
(74) *Attorney, Agent, or Firm* — Canon USA, Inc., IP Division (57) ABSTRACT

An information processing apparatus which causes a printing apparatus to print an image to which information is added, includes a causing unit for causing, when a setting is specified for adding information to an image and the information cannot be acquired from a router, the printing apparatus not to print the image, and for causing, when a setting is specified for adding information to an image and the information can be acquired from a router, the printing apparatus to print an image to which the acquired information is added.

5 Claims, 11 Drawing Sheets

"MAC ADDRESS"
002B00000

FIG. 9B

"USER NAME"　"IP ADDRESS"　"MAC ADDRESS"
　Hasama

FIG. 9C

"USER NAME"　"IP ADDRESS"　"MAC ADDRESS"

FIG. 10

INFORMATION PROCESSING APPARATUS, CONTROL METHOD THEREOF, AND PROGRAM

BACKGROUND OF THE INVENTION

1. Field of the Invention

The present invention relates to an information processing apparatus, a control method thereof, and a program.

2. Description of the Related Art

A function can be added to a printer driver installed in a host computer by additionally installing a function expansion module to the printer driver.

An example of the additional function is a copy-forgery-inhibited pattern function (e.g., refer to Japanese Patent Application Laid-Open No. 2001-197297). A copy-forgery-inhibited pattern image in an original document (i.e., a printed output from a printer) simply looks like a pattern or a background image to a viewer. However, when the original document is copied, a predetermined text or image becomes visualized. The copy-forgery-inhibited pattern thus prevents use of copy products.

Colors in the copy-forgery-inhibited pattern image and the text that becomes visualized when the original document is copied can be freely set in such a copy-forgery-inhibited pattern function added to the printer driver. Further, output date and time and information unique to a printing apparatus can also be set in the copy-forgery-inhibited pattern image.

However, according to conventional techniques, if the output date and time and the information unique to a printing apparatus cannot be acquired, there is no information to be embedded in the copy-forgery-inhibited pattern image. A copy-forgery-inhibited pattern image that has no embedded information thus becomes generated.

Such an issue is not limited to the copy-forgery-inhibited pattern image, and a similar issue occurs in a bar code, a two-dimensional code, and digital watermark.

SUMMARY OF THE INVENTION

According to an aspect of the present invention, an information processing apparatus which causes a printing apparatus to print an image to which information is added, includes a causing unit for causing, when a setting is specified for adding information to an image and the information cannot be acquired from a router, the printing apparatus not to print the image, and for causing, when a setting is specified for adding information to an image and the information can be acquired from a router, the printing apparatus to print an image to which the acquired information is added.

According to another aspect of the present invention, unnecessary printing can be prevented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
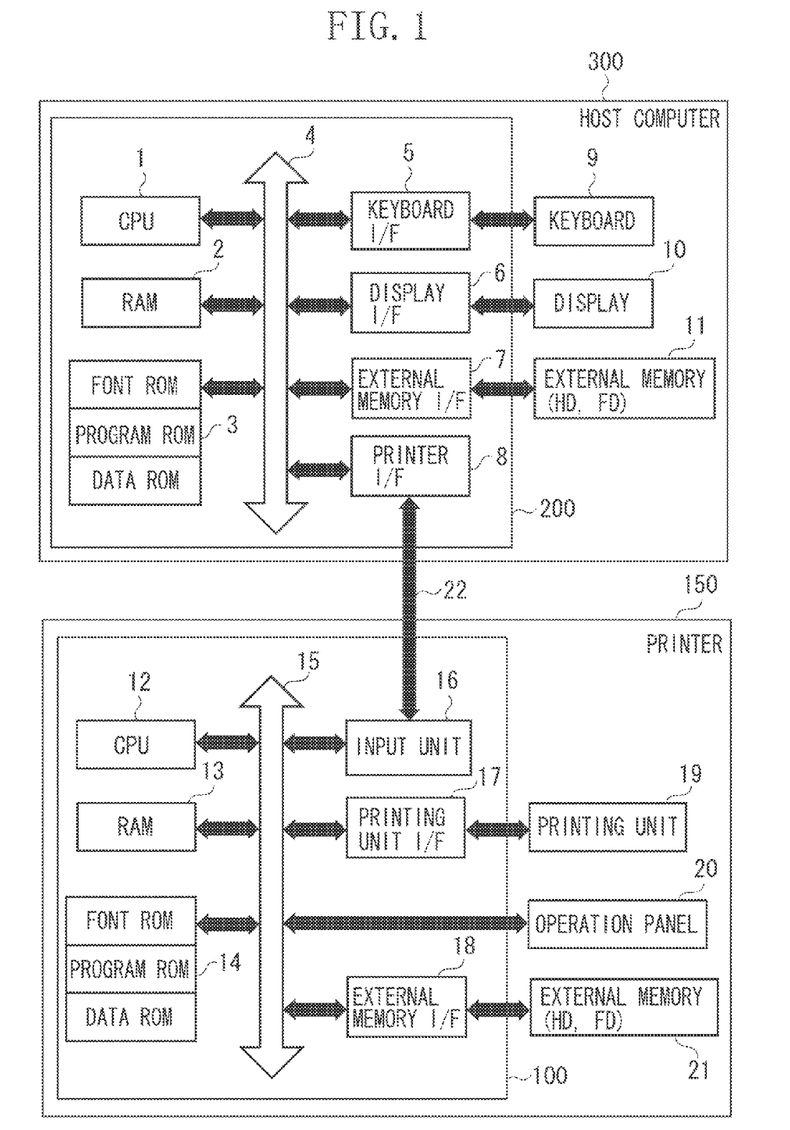
FIG. 1 is a block diagram illustrating a configuration of a system including a computer according to an exemplary embodiment of the present invention.

A printing apparatus according to the present invention will be described below. FIG. 1 is a block diagram illustrating a configuration of a system including an information processing apparatus and the printing apparatus according to a first exemplary embodiment. Unless otherwise stated, the present invention may be applied to a single device or a system including a plurality of devices as long as the functions of the present invention can be implemented. Further, unless otherwise stated, the present invention may be applied to a system in which devices are connected via a network such as a local area network (LAN) and a wide area network (WAN) to perform processing, as long as the functions of the present invention can be implemented.

Referring to FIG. 1, a host computer 300 includes a central processing unit (CPU) 1. The CPU 1 processes a document which includes a mixture of diagrams, images, characters, and tables (including spreadsheets) based on a document processing program stored in a program read-only memory (ROM) in a ROM 3, or an external memory 11. Further the CPU 1 collectively controls each of the devices connected to a system bus 4.

The program ROM in the ROM 3 or the external memory 11 stores an operating system program (OS), i.e., a control program of the CPU 1. Further, a font ROM in the ROM 3 or the external memory 11 stores font data used in the document processing described above. A data ROM in the ROM 3 or the external memory 11 stores various data pieces used in the document processing described above.

A random access memory (RAM) 2 functions as a main memory and a work area of the CPU 1. A keyboard interface (I/F) 5 controls a key input from a keyboard 9 or a pointing device (not illustrated). A display I/F 6 controls displaying on a display 10. An external memory I/F 7 controls access to the external memory 11 such as a hard disk (HD) or a floppy disk (FD). The external memory 11 stores a boot program, various applications, the font data, a user file, an edit file, printer drivers, and the like.

A printer I/F 8 is connected to a printer 150 via a predetermined bi-directional interface 22, and controls communication between the printer 150. The CPU 1 rasterizes outline fonts on a display information RAM set on the RAM 2, and thus realizes a "what you see is what you get" (WYSIWYG) function on the display 10.

Further, the CPU 1 opens various windows registered based on a command instructed by a mouse cursor (not illustrated) on the cathode ray tube (CRT) display 10, and performs various types of data processing. When a user executes printing, the user opens a print setting window and can specify printer settings, and a print processing method with respect to the printer driver including selection of a print mode.

A printer CPU 12 in the printer 150 outputs an image signal as output information to a printing unit (printer engine) 17 connected to a system bus 15 based on the control program. The control program is stored in a program ROM in a ROM 14 or an external memory 21.

The program ROM in the ROM 14 stores the control program of the CPU 12 or the like. A font ROM in the ROM 14 stores font data used in generating the output information, and a data ROM in the ROM 14 stores, if the printer does not include the external memory 21 such as the HD, information to be used in the host computer 300.

The CPU 12 can communicate with the host computer 300 via an input unit 16, and can notify the host computer 300 of information in the printer. A RAM 13 functions as the main memory and the work area of the CPU 12. A memory capacity of the RAM 13 can be increased by connecting an option RAM to an expansion port (not illustrated). The RAM 13 is used as an output information expansion area, an environmental data storing area, and a non-volatile (NV) RAM. A memory controller (MC) 18 controls access to the external memory 21 such as the HD or an integrated circuit (IC) card.

The external memory 21 is connected as an option, and stores the font data, an emulation program, and form data. An operation panel 20 includes operation switches and light emitting diode (LED) indicators. The number of external memories is not limited to one. The printer may be configured to include at least one or more external memories and to be connectable to an optional font card in addition to built-in fonts and a plurality of external memories storing programs for interpreting printer control languages of different languages. Further, the printer may include the NVRAM (not illustrated) for storing printer mode setting information input from the operation panel 20.

Figure 2:
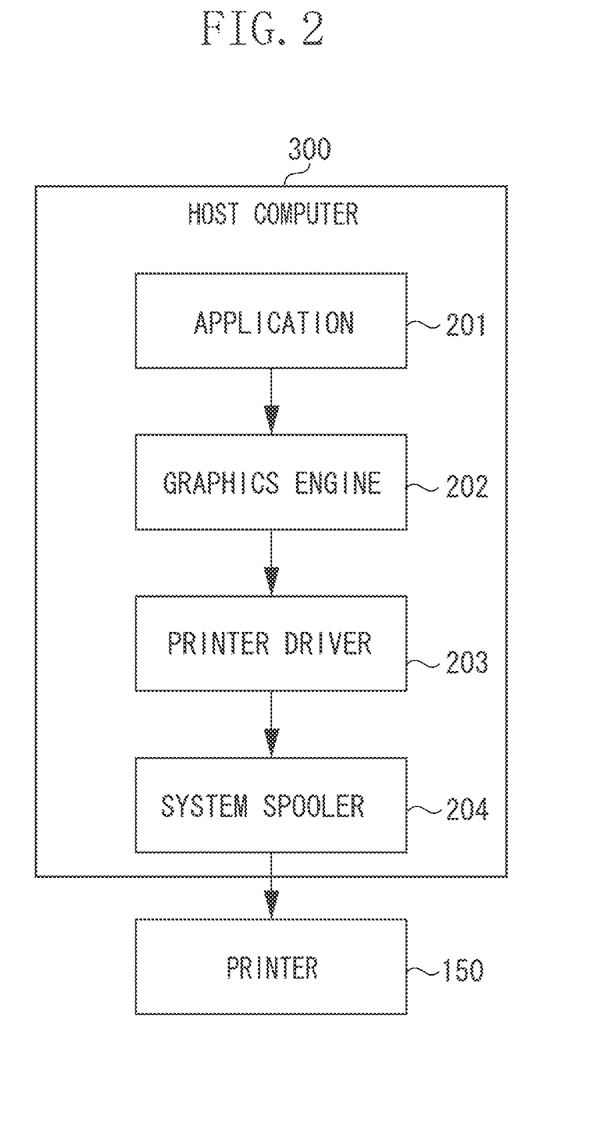
FIG. 2 is a block diagram illustrating a typical print system according to an exemplary embodiment of the present invention.

FIG. 2 illustrates a configuration of typical print processing performed in the host computer directly connected or connected via a network to the printing apparatus such as a printer. Referring to FIG. 2, an application 201, a graphic engine 202, a printer driver 203, and a system spooler 204 exist as files stored in the external memory 11. Such files are program modules which are loaded to the RAM 2 and executed by the OS or a module using the program module. The application 201 and the printer driver 203 can be added to the external memory 11 such as the FD, a compact disk (CD)-ROM (not illustrated), or the external memory 11 such as the HD via the network (not illustrated).

The application 201 stored in the external memory 11 is loaded to the RAM 2 and executed. If a user performs printing on the printer 150 from the application 201, the printer outputs (performs drawing) using the graphic engine 202 that is similarly loaded on the RAM 2 to be executable.

The graphic engine 202 loads to the RAM 2 from the external memory 11, the printer driver 203 prepared for each printing apparatus. The graphic engine 202 then uses the printer driver 203 to convert the output of the application 201 to a control command for the printer. The converted printer control command is output by the OS to the printer 150 via the system spooler 204 loaded to the RAM 2 and via the interface 22.

Figure 3:
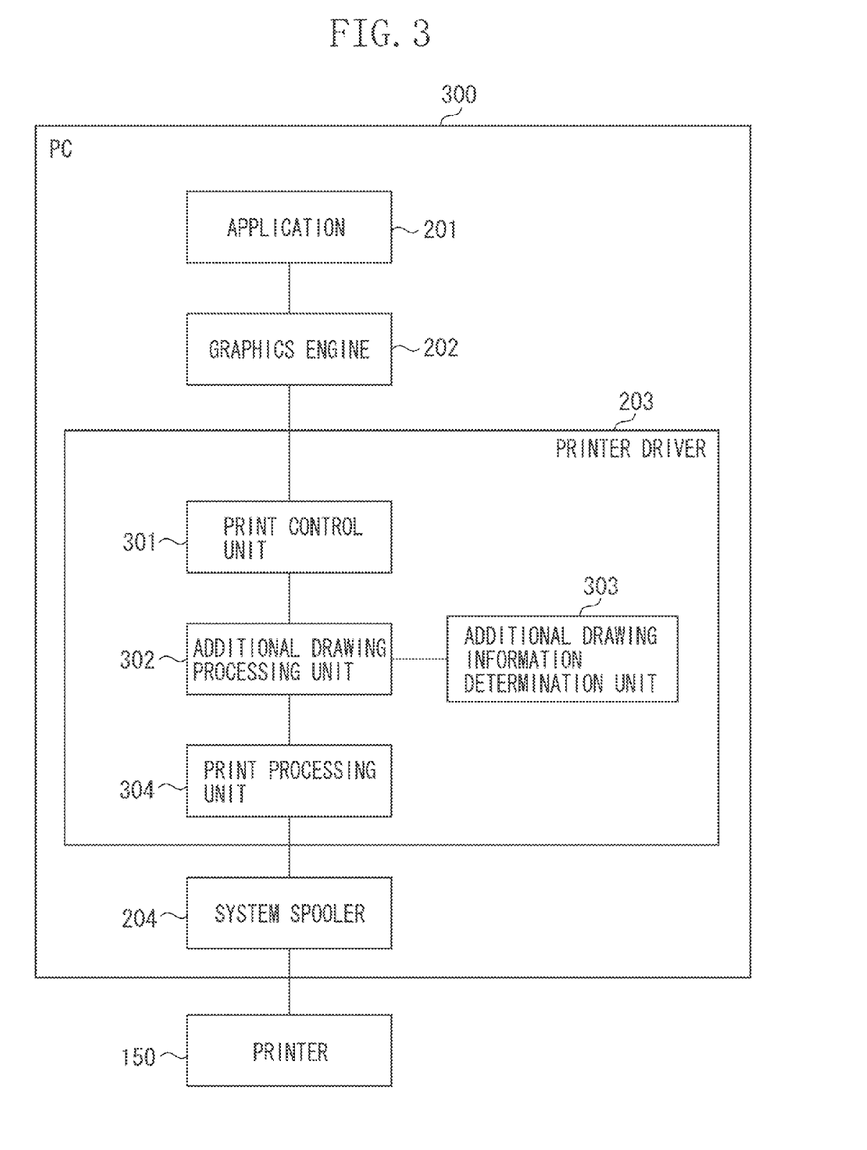
FIG. 3 illustrates a system configuration according to an exemplary embodiment of the present invention.

FIG. 3 illustrates an example of the configurations of the printer driver 203 and the printer 150 according to the present exemplary embodiment. According to the present exemplary embodiment, the printer driver 203 includes a print control unit 301, an additional drawing processing unit 302, an additional drawing information determination unit 303, and a print processing unit 304. The print control unit 301 controls the print data. The additional drawing processing unit 302 processes the additional drawing. The additional drawing information determination unit 303 determines the additional drawing information. The print processing unit 304 processes the print data.

Figure 4:
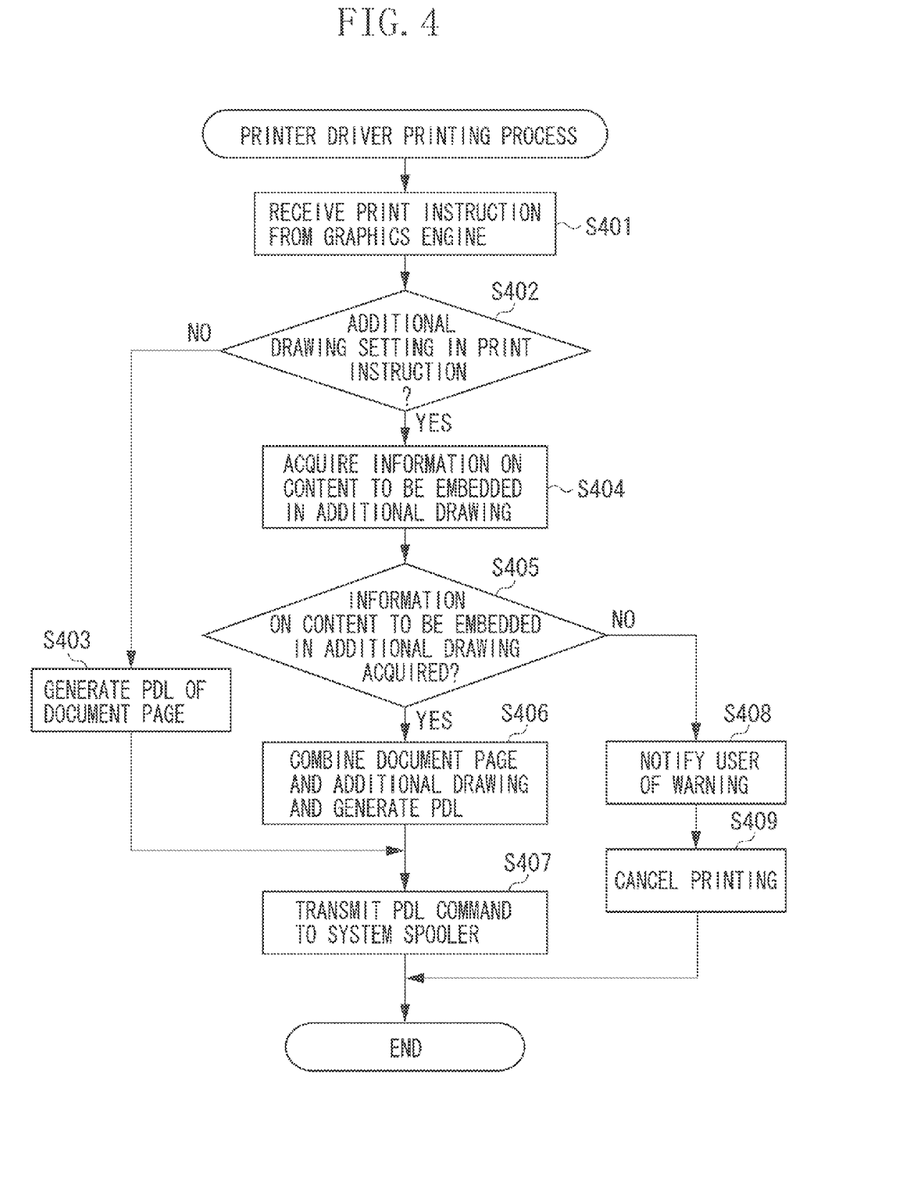
FIG. 4 is a flowchart illustrating print processing performed by a printer driver.

Additional drawing processing performed by the printer driver 203 according to the present exemplary embodiment will be described below with reference to FIG. 4. The program of the printer driver 203 according to the processing in flowchart illustrated in FIG. 4 is stored in the HD 11 of the computer, read out to the RAM 2, and executed by the CPU 1.

Figure 10:
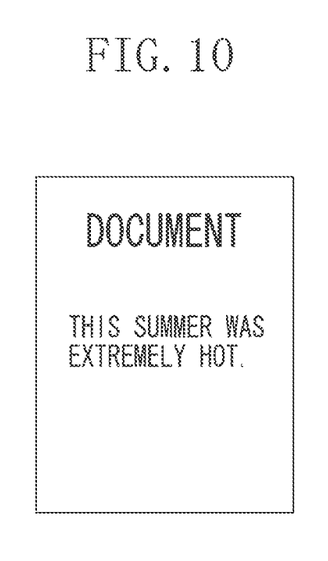
FIG. 10 illustrates an example of print data.

FIG. 10 illustrates an example of a document to be printed according to the present exemplary embodiment. Referring to FIG. 4, in step S401, upon the user executing printing of the document illustrated in FIG. 10 from the application 201, the printer driver 203 is called via the graphics engine 202. The print control unit 301 then receives the print data and a print instruction of the document.

In step S402, the additional drawing processing unit 302 determines whether the print instruction received in step S401 includes an additional drawing setting. If the additional drawing processing unit 302 determines that the print instruction received in step S401 does not include the additional drawing setting (NO in step S402), the processing proceeds to step S403 without performing additional drawing processing.

In step S403, the print processing unit 304 converts the print data of the document received in step S401 to a print command referred to as page description language (PDL).

In step S407, the print processing unit 304 transmits the print command to the system spooler 204.

Figure 9A:
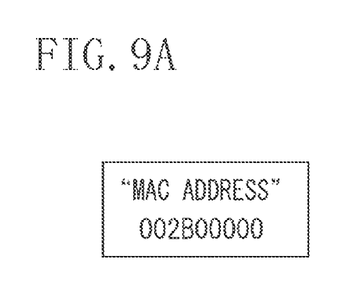
FIGS. 9A, 9B, and 9C illustrate examples of information about the content to be embedded in the additional drawing.

On the other hand, if the additional drawing processing unit 302 determines that the print instruction includes the additional drawing setting (YES in step S402), the processing proceeds to step S404. In step S404, the additional drawing processing unit 302 acquires from the computer which instructed printing, the information about the content to be embedded in the additional drawing set in the printing instruction received in step S401. According to the present exemplary embodiment, the information about the content to be embedded in the additional drawing is "medium access control (MAC) address" as illustrated in FIG. 9A. However, the information may be any information as long as the computer or the user can be identified, such as "user name" or "Internet protocol (IP) address".

In step S405, the additional drawing information determination unit 303 determines whether the information to be embedded in the additional drawing which is acquired in step S404 has been normally acquired. If the additional drawing information determination unit 303 determines that the information to be embedded in the additional drawing has been normally acquired (YES in step S405), the processing proceeds to step S406.

In step S406, the additional drawing processing unit 302 combines the print data of the document received in step S401 and the additional drawing data, and converts the data to the print command referred to as PDL. In step S407, the print processing unit 304 transmits the print command to the system spooler 204.

If the additional drawing information determination unit 303 determines that the information to be embedded in the additional drawing has not been normally acquired (NO in step S405), the processing proceeds to step S408.

Figure 5:
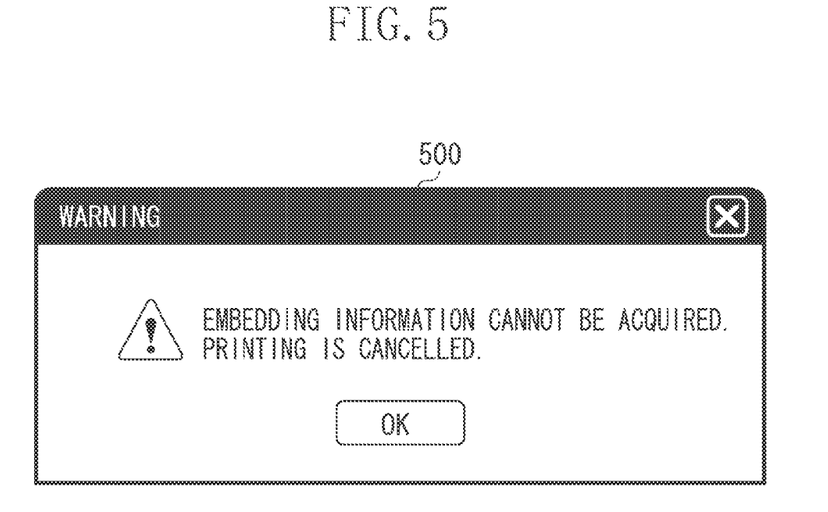
FIG. 5 illustrates an example of a warning screen.

In step S408, the additional drawing processing unit 302 notifies the user of a warning screen 500 as illustrated in FIG. 5 indicating that the information to be embedded cannot be acquired. The processing then proceeds to step S409. In step S409, the print processing unit 304 discards the print data of the document and the print instruction received in step S401, and cancels printing.

By performing the processing according to the flowchart illustrated in FIG. 4, if the additional drawing setting is specified but the information to be embedded in the additional drawing is not normally acquired, the warning screen indicating that printing will be cancelled is notified to the user, and printing is cancelled.

By the above-described procedure, if the information to be embedded in the additional drawing is not normally acquired, the warning screen indicating that printing will be cancelled is notified to the user, and printing is cancelled. As a result, generation of the copy-forgery-inhibited pattern image which is not visualized when the original document is copied can be prevented.

According to the first exemplary embodiment, there is only one piece of information about the content to be embedded in the additional drawing set by the print instruction. According to a second exemplary embodiment, a plurality of pieces of information about the content is to be embedded in the additional drawing set by the print instruction, as will be described below with reference to a flowchart illustrated in FIG. 6.

Figure 6:
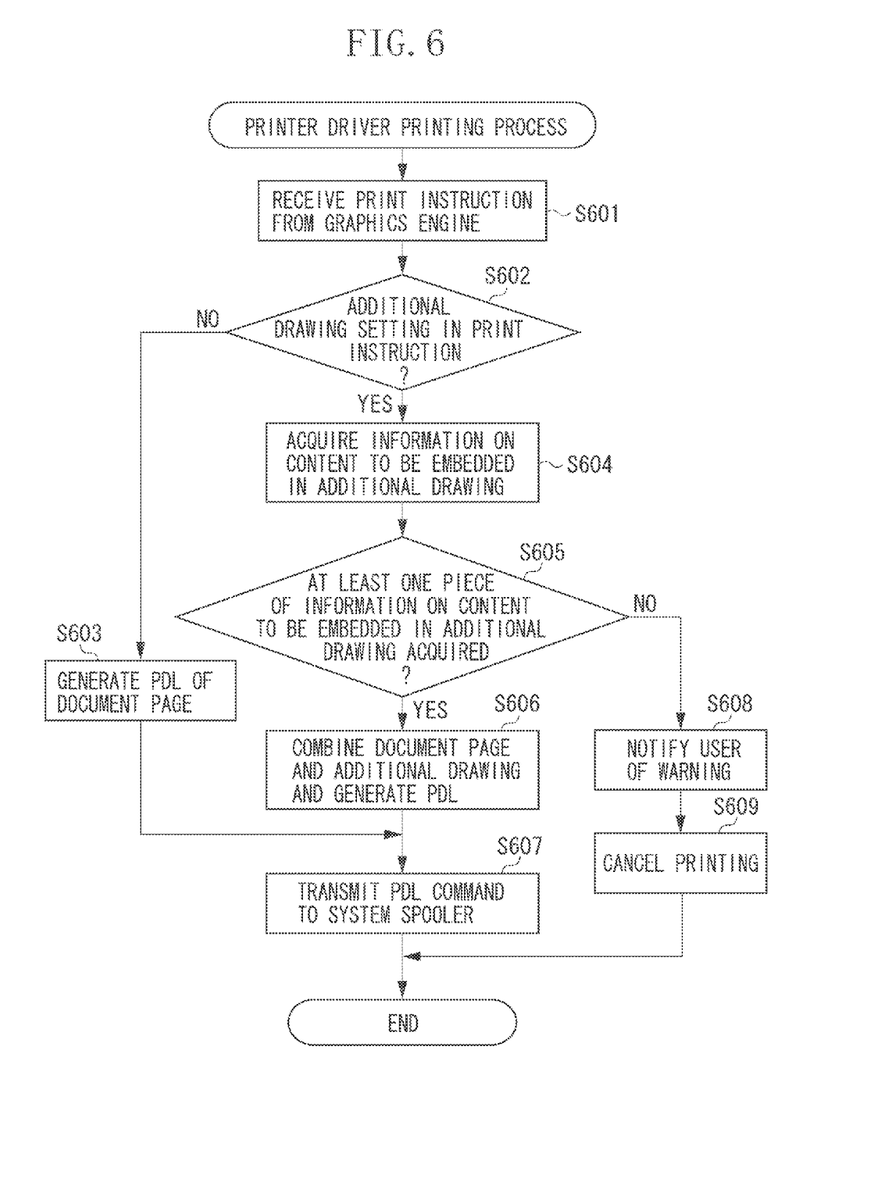
FIG. 6 is a flowchart illustrating print processing performed by a printer driver in a case where there is a plurality of information pieces on contents to be embedded in an additional drawing.

The program of the printer driver 203 according to the flowchart illustrated in FIG. 6 is stored in the HD 11 of the computer, read out to the RAM 2, and executed by the CPU 1.

Figure 9B:
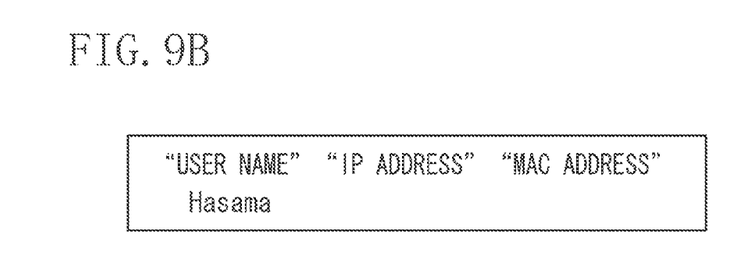
Figure 9C:
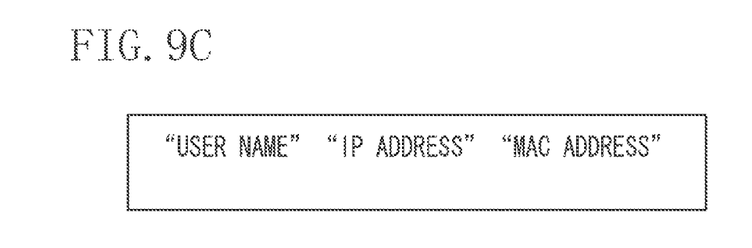

The processing performed in step S601 to step S603 illustrated in FIG. 6 are similar to those performed in step S401 to step S403 illustrated in FIG. 4, so that description will be omitted. In step S604, the additional drawing processing unit 302 acquires from the computer that has instructed printing, the information about the content to be embedded in the additional drawing set in the print instruction received in step S601. According to the present exemplary embodiment, the information about the content to be embedded in the additional drawing is "user name", "IP address", and "MAC address" as illustrated in FIGS. 9B and 9C. However, the information may be any information as long as the computer or the user can be identified. Further, there may be any number of information pieces about the content to be embedded to the additional drawing.

In step S605, the additional drawing information determination unit 303 determines whether at least one piece of information to be embedded in the additional drawing is acquired in step S604. If the additional drawing information determination unit 303 determines that at least one piece of information to be embedded in the additional drawing is acquired as illustrated in FIG. 9B (YES in step S605), the processing proceeds to step S606.

In step S606, the additional drawing processing unit 302 combines the print data of the document received in step S601 and the additional drawing data, and converts the data to the print command referred to as PDL. In step S607, the print processing unit 304 transmits the print command to the system spooler 204.

If the additional drawing information determination unit 303 determines that none of the information to be embedded in the additional drawing is acquired as illustrated in FIG. 9C (NO in step S605), the processing proceeds to step S608.

In step S608, the additional drawing processing unit 302 notifies the user of the warning screen 500 as illustrated in FIG. 5 indicating that the information to be embedded cannot be acquired. The processing then proceeds to step S609. In step S609, the print processing unit 304 discards the print data of the document received and the print instruction in step S601, and cancels printing.

By performing the processing according to the flowchart illustrated in FIG. 6, if the additional drawing setting is specified, there is a plurality of pieces of information to be embedded in the additional drawing, and at least one of the information can be acquired, only the acquired information is generated as the copy-forgery-inhibited pattern image.

According to the above-described processing, if there is a plurality of pieces of information to be embedded in the additional drawing and at least one of the information can be acquired, only the acquired information is generated as the copy-forgery-inhibited pattern image. As a result, the copy-forgery-inhibited pattern image which becomes visualized when the original document is copied can be generated.

According to the first exemplary embodiment, the computer instructs the printer to perform output processing via the network. According to a third exemplary embodiment, if a client PC is to execute printing, the application or the printer driver conventionally executed by the client PC is executed by a server PC, such as in MetaFrame and remote desktop. The system according to the third exemplary embodiment will be described below with reference to a flowchart illustrated in FIGS. 7A and 7B.

Figure 8:
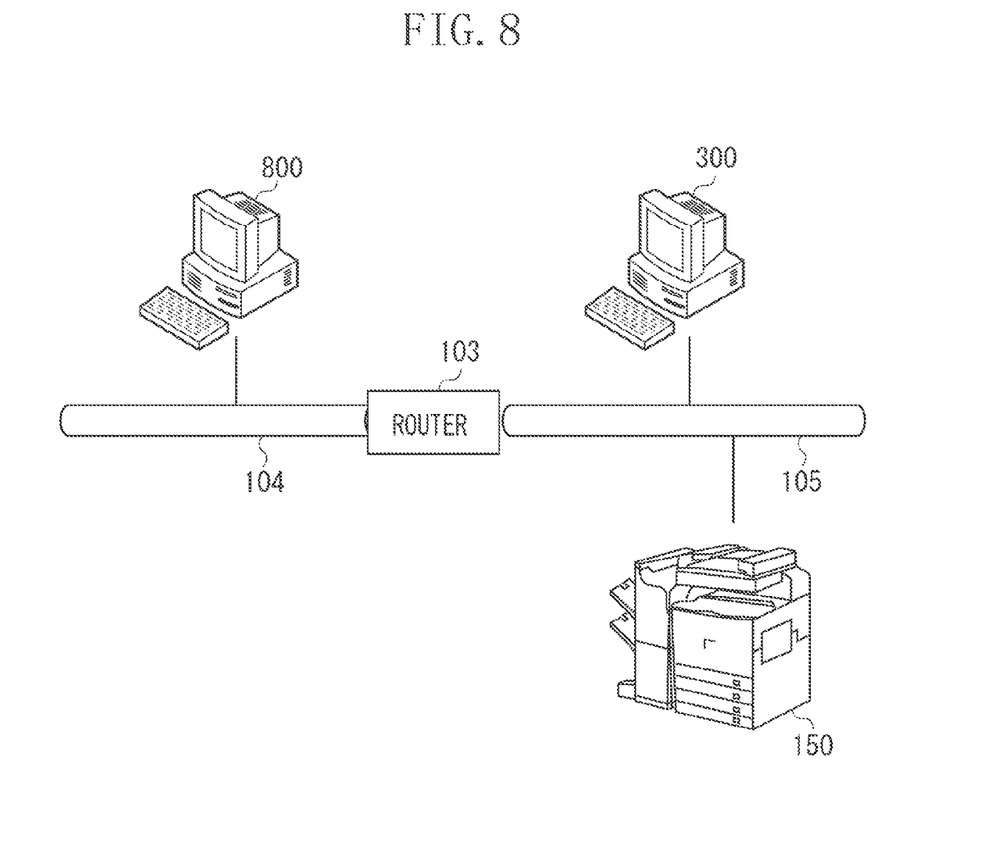
FIG. 8 illustrates a system configuration according to an exemplary embodiment of the present invention.

FIG. 8 is a block diagram illustrating a schematic configuration of a network system according to the present exemplary embodiment of the present invention. Referring to FIG. 8, the network system includes a client PC 800, a server PC 300, and an output device 150 that receives print data from the server PC 300 and performs printing. Further, each of the components is connected to a LAN 104 or a WAN 105 via a router 103. A MAC address filtering and an IP address filtering are set to the router 103, and only the "MAC address" and the "IP address" of the client PC 800 are described in the router 103.

According to the present exemplary embodiment, the application 201 and the printer driver 203 in the server PC 300 are executed from the client PC 800 using the remote desktop.

Figure 7A:
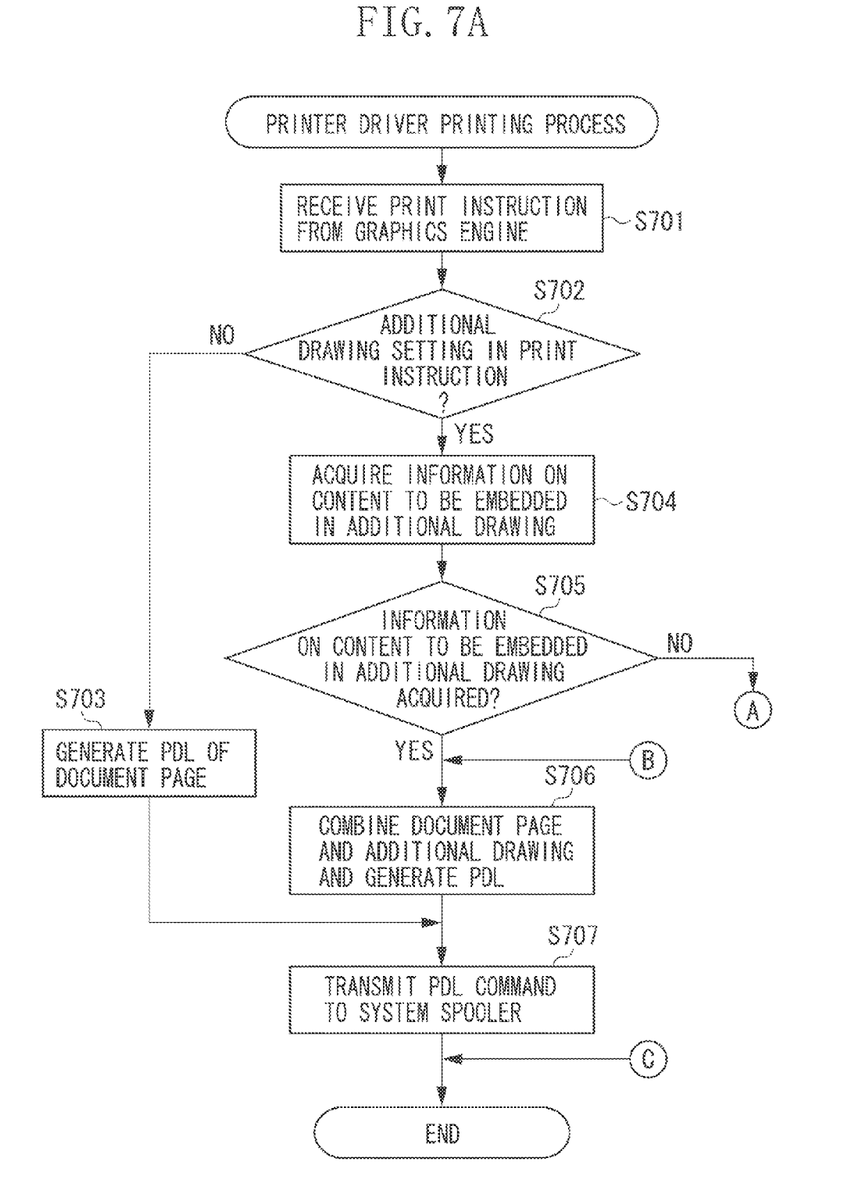
FIGS. 7A and 7B are a flowchart illustrating print processing performed by a printer driver in a remote environment.
Figure 7B:
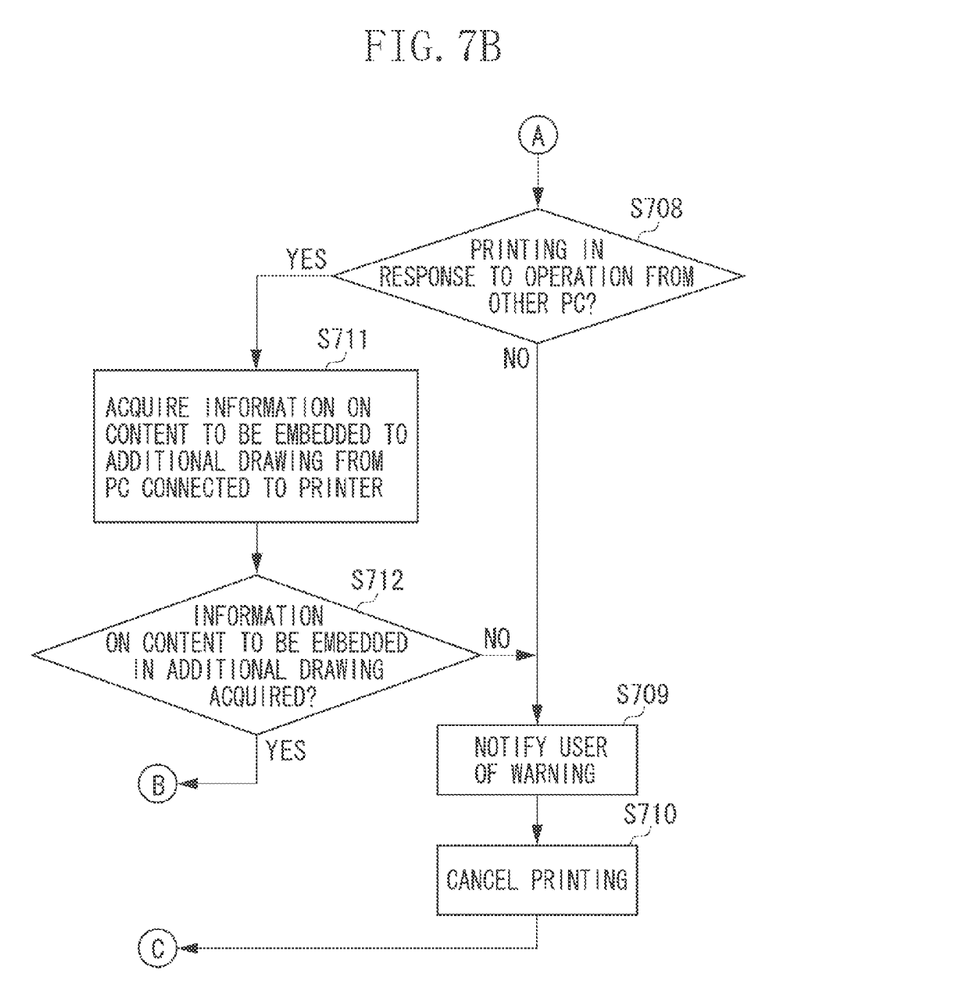

The program of the printer driver 203 according to the flowchart illustrated in FIGS. 7A and 7B is stored in the HD 11 of the server PC 300, read out to the RAM 2, and executed by the CPU 1.

The processing performed in step S701 to step S703 illustrated in FIGS. 7A and 7B are similar to those performed in step S401 to step S403 illustrated in FIG. 4, so that description will be omitted. In step S704, the additional drawing processing unit 302 acquires from the client PC 800, the information about the content to be embedded to the additional drawing set in the print instruction received in step S701. According to the present exemplary embodiment, the information about the content to be embedded in the additional drawing is "MAC address" as illustrated in FIG. 9A. However, the information may be any information as long as the computer or the user can be identified, such as "user name" or "IP address". Further, there may be any number of information pieces about the content to be embedded to the additional drawing.

According to the present exemplary embodiment, the MAC address filtering is set to the router 103, and only the MAC address and the IP address of the client PC 800 are described in the router 103. If acquisition of the "MAC address" of the client PC 800 is attempted from the server PC 300 in such a state, the router 103 blocks communication, so that the "MAC address" of the client PC 800 cannot be acquired from the server PC 300.

In step S705, the additional drawing information determination unit 303 determines whether the information to be embedded in the additional drawing which is acquired in step S704 has been normally acquired. If the additional drawing information determination unit 303 determines that the information to be embedded in the additional drawing has been normally acquired (YES in step S705), the processing proceeds to step S706.

In step S706, the additional drawing processing unit 302 combines the print data of the document received in step S701 and the additional drawing data, and converts the data to the print command referred to as PDL. In step S707, the print processing unit 304 transmits the print command to the system spooler 204.

On the other hand, if the additional drawing information determination unit 303 determines that the information to be embedded in the additional drawing has not been normally acquired (NO in step S705), the processing proceeds to step S708.

In step S708, the additional drawing processing unit 302 determines whether printing is to be performed according to an operation received from another computer. If the additional drawing unit 303 determines that printing is to be performed not according to an operation received from another computer (NO in step S708), the processing proceeds to step S709.

In step S709, the additional drawing processing unit 302 notifies the user of the warning screen 500 as illustrated in FIG. 5 indicating that the information to be embedded cannot be acquired. The processing then proceeds to step S710. In step S710, the print processing unit 304 discards the print data of the document and the print instruction received in step S701, and cancels printing.

On the other hand, if the additional drawing processing unit 302 determines that printing is to be performed according to an operation received from another computer (YES in step S708), the processing proceeds to step S711. In step S711, the additional drawing processing unit 302 acquires from the computer connected to the printer, the information about the content to be embedded in the additional drawing set by the print instruction received in step S701. According to the present exemplary embodiment, the additional drawing processing unit 302 acquires the information from the server PC 300. The processing then proceeds to step S712.

In step S712, the additional drawing information determination unit 303 determines whether the information to be embedded in the additional drawing is normally acquired in step S711. If the additional drawing information determination unit 303 determines that the information to be embedded in the additional drawing is normally acquired (YES in step S712), the processing proceeds to step S706.

In step S706, the additional drawing processing unit 302 combines the print data of the document received in step S701 and the additional drawing data, and converts the data to the print command referred to as PDL. In step S707, the print processing unit 304 transmits the print command to the system spooler 204.

If the additional drawing information determination unit 303 determines that the information to be embedded in the additional drawing is not normally acquired (NO in step S712), the processing proceeds to step S709.

In step S709, the additional drawing processing unit 302 notifies the user of the warning screen 500 as illustrated in FIG. 5 indicating that the information to be embedded cannot be acquired. The processing then proceeds to step S710. In step S710, the print processing unit 304 discards the print data of the document and the print instruction received in step S701, and cancels printing.

By performing the processing according to the flowchart illustrated in FIGS. 7A and 7B, if the additional drawing setting is specified and the information to be embedded in the additional drawing cannot be acquired, acquisition of the information to be embedded in the additional drawing is attempted from the PC which executes printing.

According to the above-described processing, if the information to be embedded in the additional drawing can be acquired, only the acquired information is generated as the copy-forgery-inhibited pattern image. As a result, the copy-forgery-inhibited pattern image which becomes visualized when the original document is copied can be generated.

The present invention can also be realized by executing the following processing. More specifically, software (a program) for realizing the functions of the above exemplary embodiments is supplied to a system or an apparatus via a network or various storage media and a computer (or CPU or micro processing unit (MPU)) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-272702 filed Dec. 7, 2010, which is hereby incorporated by reference herein in its entirety.

What is claimed is:

1. An information processing apparatus comprising:
   an input unit configured to input an image;
   a setting unit configured to set items to be synthesized as a copy-forgery-inhibited pattern image with the input image;
   an obtaining unit configured to obtain the items set by the setting unit; and
   a control unit configured to control
   (a) a printing apparatus to print, if all of the set items are obtained by the obtaining unit, an image generated by synthesizing the input image with a copy-forgery-inhibited pattern image which is generated based on the obtained all of the items,
   (b) the printing apparatus to print, if one of the set items is not obtained but remaining set items are obtained by the obtaining unit, an image generated by synthesizing the input image with a copy-forgery-inhibited pattern image which is generated based on the obtained remaining set items, and
   (c) the printing apparatus to print, if none of the set items is obtained by the obtaining unit, neither the input image nor a copy-forgery-inhibited pattern.

2. The information processing apparatus according to claim 1, wherein the set items include a MAC address of a different information processing apparatus.

3. An information processing method comprising:
   inputting an image;
   setting items to be synthesized as a copy-forgery-inhibited pattern image with the input image;
   obtaining the items set by the setting; and
   controlling (a) a printing apparatus to print, if all of the set items are obtained by the obtaining, an image generated by synthesizing the input image with a copy-forgery-inhibited pattern image which is generated based on the obtained all of the items, (b) the printing apparatus to print, if one of the set items is not obtained but remaining set items are obtained by the obtaining, an image generated by synthesizing the input image with a copy-forgery-inhibited pattern image which is generated based on the obtained remaining set items, and (c) the printing apparatus to print, if none of the set items is obtained by the obtaining, neither the input image nor a copy-forgery-inhibited pattern.

4. The information processing method according to claim 3, wherein the set items include a MAC address of a different information processing apparatus.

5. A non-transitory computer-readable storage medium for storing a program executable by a computer for executing an information processing method, the method comprising:

inputting an image;

setting items to be synthesized as a copy-forgery-inhibited pattern image with the input image;

obtaining the items set by the setting; and controlling (a) a printing apparatus to print, if all of the set items are obtained by the obtaining, an image generated by synthesizing the input image with a copy-forgery-inhibited pattern image which is generated based on the obtained all of the items, (b) the printing apparatus to print, if one of the set items is not obtained but remaining set items are obtained by the obtaining, an image generated by synthesizing the input image with a copy-forgery-inhibited pattern image which is generated based on the obtained remaining set items, and (c) the printing apparatus to print, if none of the set items is obtained by the obtaining, neither the input image nor a copy-forgery-inhibited pattern.

* * * * *